United States Patent
Frame et al.

(10) Patent No.: US 12,199,418 B2
(45) Date of Patent: Jan. 14, 2025

(54) SYSTEM AND METHOD FOR IMPROVED MECHANICAL AND ELECTRICAL CONNECTION OF HIGH VOLTAGE WIRING HARNESS

(71) Applicant: Electrical Components International, Inc., St. Louis, MO (US)

(72) Inventors: Andrew Frame, Webster, NY (US); Billy T. Stojanovski, Penfield, NY (US); Peter Farrell, Rochester, NY (US)

(73) Assignee: Electrical Components International, Inc., St. Louis, MO (US)

( * ) Notice: Subject to any disclaimer, the term of this patent is extended or adjusted under 35 U.S.C. 154(b) by 0 days.

(21) Appl. No.: 17/733,810

(22) Filed: Apr. 29, 2022

(65) Prior Publication Data
US 2023/0352921 A1    Nov. 2, 2023

(51) Int. Cl.
*H02G 3/06* (2006.01)
*B60R 16/02* (2006.01)
*H02G 3/04* (2006.01)

(52) U.S. Cl.
CPC ....... *H02G 3/0691* (2013.01); *B60R 16/0215* (2013.01); *H02G 3/0468* (2013.01); *H02G 3/0481* (2013.01)

(58) Field of Classification Search
CPC ............ B60R 16/0215; B60R 16/0207; B60R 16/0222; H01B 7/0045; H02G 3/04; H02G 3/30; H02G 3/32; H02G 3/0418; H02G 3/0481; H02G 3/0691; H01R 13/52; H01R 13/05219
See application file for complete search history.

(56) References Cited

U.S. PATENT DOCUMENTS

| | | | |
|---|---|---|---|
| 2012/0258635 A1* | 10/2012 | Osawa | H01R 13/50 439/660 |
| 2014/0190744 A1* | 7/2014 | Fuzioka | H01R 4/20 174/77 R |
| 2016/0329651 A1* | 11/2016 | Yamaguchi | H01R 13/44 |

FOREIGN PATENT DOCUMENTS

CN        109565100 A   *   4/2019   .........   H01B 11/1804

* cited by examiner

*Primary Examiner* — Paresh Paghadal
(74) *Attorney, Agent, or Firm* — Rothwell, Figg, Ernst & Manbeck, P.C.

(57) ABSTRACT

A system and method for connecting a high voltage wiring harness assembly to a vehicle. The system includes a tubing configured to provide an enclosure for the high voltage wiring harness assembly. The material used to form the tubing includes polytetrafluoroethylene to protect the high voltage wiring harness assembly from abrasion and to insulate the high voltage wiring harness assembly from substantial temperature fluctuations. The system may include an adapter plate configured to provide a mechanical and electrical grounding connection to the vehicle. The system may include a coupling assembly configured to couple the tubing and the adapter plate. The coupling provides a water tight seal between the tubing and the adapter plate. The high voltage wiring harness assembly includes a grounding braid. The coupling assembly is further configured to couple the grounding braid to the adapter plate for completing an electrical circuit between the grounding braid and the vehicle.

12 Claims, 14 Drawing Sheets

SYSTEM AND METHOD FOR IMPROVED MECHANICAL AND ELECTRICAL CONNECTION OF HIGH VOLTAGE WIRING HARNESS

TECHNICAL FIELD

The technical field relates generally to high voltage wiring applications in the transportation industry. Disclosed are aspects related to systems and methods for connecting a high voltage wiring harness assembly to a vehicle.

BACKGROUND

Connecting electrical systems to a heavy-duty vehicle, such as, for example a bus, is primarily achieved in the industry using relatively small-scale, pre-made connection systems that are not custom built to the vehicle. These systems may make use of a tubing to enclose the wiring that performs the electrical connection. Conventionally, the tubing used for this purpose is typically made from two materials: polypropylene and polyethylene. With some exceptions, the use of these two materials satisfies the automotive industry. However, the use of these two materials has an electrical conductivity of 5-10 Siemens/cm. This relatively high conductivity may be unacceptable for some applications.

SUMMARY

Accordingly, there is a need in the industry for a system and method for improved mechanical and electrical connection of a high voltage wiring harness assembly to a vehicle that can provide a tubing that exhibits lower conductivity, while also providing protection from abrasion and substantial temperature fluctuations.

The following description presents a simplified summary in order to provide a basic understanding of some aspects described herein. This summary is not an extensive overview of the claimed subject matter. It is intended to neither identify key or critical elements of the claimed subject matter nor delineate the scope thereof.

According to a first aspect, a system for connecting a high voltage wiring harness assembly to a vehicle is provided. The system may include a tubing configured to provide an enclosure for the high voltage wiring harness assembly. The material used to form the tubing may include polytetrafluoroethylene to protect the high voltage wiring harness assembly from abrasion and to insulate the high voltage wiring harness assembly from substantial temperature fluctuations. The system may also include an adapter plate configured to provide a mechanical and electrical grounding connection to the vehicle. The system may also include a coupling assembly configured to couple the tubing and the adapter plate. The coupling assembly may provide a water tight seal between the tubing and the adapter plate. The high voltage wiring harness assembly may include a grounding braid. The coupling assembly may further be configured to couple the grounding braid to the adapter plate for completing an electrical circuit between the grounding braid and the vehicle.

According to some aspects, the coupling assembly may be composed of stainless steel. According to some aspects, the tubing may be convoluted. According to some aspects, the material used to form the tubing may further include polypropylene and polyethylene. According to some aspects, the material used to form the tubing may insulate the high voltage wiring harness assembly from substantial temperature fluctuations may range from −70 degrees Celsius to 260 degrees Celsius. According to some aspects, the adapter plate may include a rectangular base with an interior gap and a notch in one of its edges and a cylinder connected to the rectangular base. According to some aspects, the cylinder may include an elliptical bottom, a circular top, and a surface that connects the circular bottom to the circular top. According to some aspects, the circular bottom may be connected to the rectangular base. According to some aspects, the radius of the semimajor axis of the elliptical bottom may be larger than the radius of the circular top. According to some aspects, the cylinder may be welded to the rectangular base. According to some aspects, the rectangular base and the cylinder may be connected such that the rectangular base and the cylinder are a single component. According to some aspects, the cylinder may be connected to the rectangular base of the adapter plate by a plurality of fasteners. According to some aspects, the system may include a gasket that is configured to be connected to the adapter plate and the vehicle. According to some aspects, the high voltage wiring harness may be a 600V rated transportation harness.

According to a second aspect, a method for connecting a high voltage wiring harness assembly to a vehicle using a tubing, an adapter plate, and a coupling assembly is provided. The method may include enclosing the high voltage wiring harness assembly in the tubing. The material used to form the tubing may include polytetrafluoroethylene to protect the high voltage wiring harness assembly from abrasion, and to insulate the high voltage wiring harness assembly from substantial temperature fluctuations. The method may also include connecting the adapter plate to the vehicle to provide a mechanical and electrical grounding connection. The method may also include coupling the tubing and the adapter plate using the coupling assembly to provide a water tight seal between the tubing and the adapter plate. The high voltage wiring harness assembly may include a grounding braid. The grounding braid may be coupled to the adapter plate using the coupling assembly to complete an electrical circuit between the grounding braid and the vehicle.

According to some aspects, the coupling assembly may be composed of stainless steel. According to some aspects, the tubing may be convoluted. According to some aspects, the material used to form the tubing may further include polypropylene and polyethylene. According to some aspects, the material used to form the tubing may insulate the high voltage wiring harness assembly from substantial temperature fluctuations ranging from −70 degrees Celsius to 260 degrees Celsius. According to some aspects, the adapter plate may include a rectangular base. According to some aspects, the rectangular base has an interior gap and a notch in one of its edges. According to some aspects, a cylinder is connected to the rectangular base. According to some aspects, the cylinder may include an elliptical bottom, a circular top, and a surface that connects the circular bottom to the circular top. According to some aspects, the circular bottom may be connected to the rectangular base, and the radius of the semimajor axis of the elliptical bottom may be larger than the radius of the circular top. According to some aspects, the cylinder may be welded to the rectangular base. According to some aspects, the rectangular base and the cylinder may be connected such that the rectangular base and the cylinder are a single component. According to some aspects, the cylinder may be connected to the rectangular base of the adapter plate by a plurality of fasteners. According to some aspects, the high voltage wiring harness may be a 600V rated transportation harness.

Further variations encompassed within the systems and methods are described in the detailed description of the invention below.

BRIEF DESCRIPTION OF THE DRAWINGS

The accompanying drawings, which are incorporated herein and form part of the specification, illustrate various aspects.

DETAILED DESCRIPTION

Figure 1:
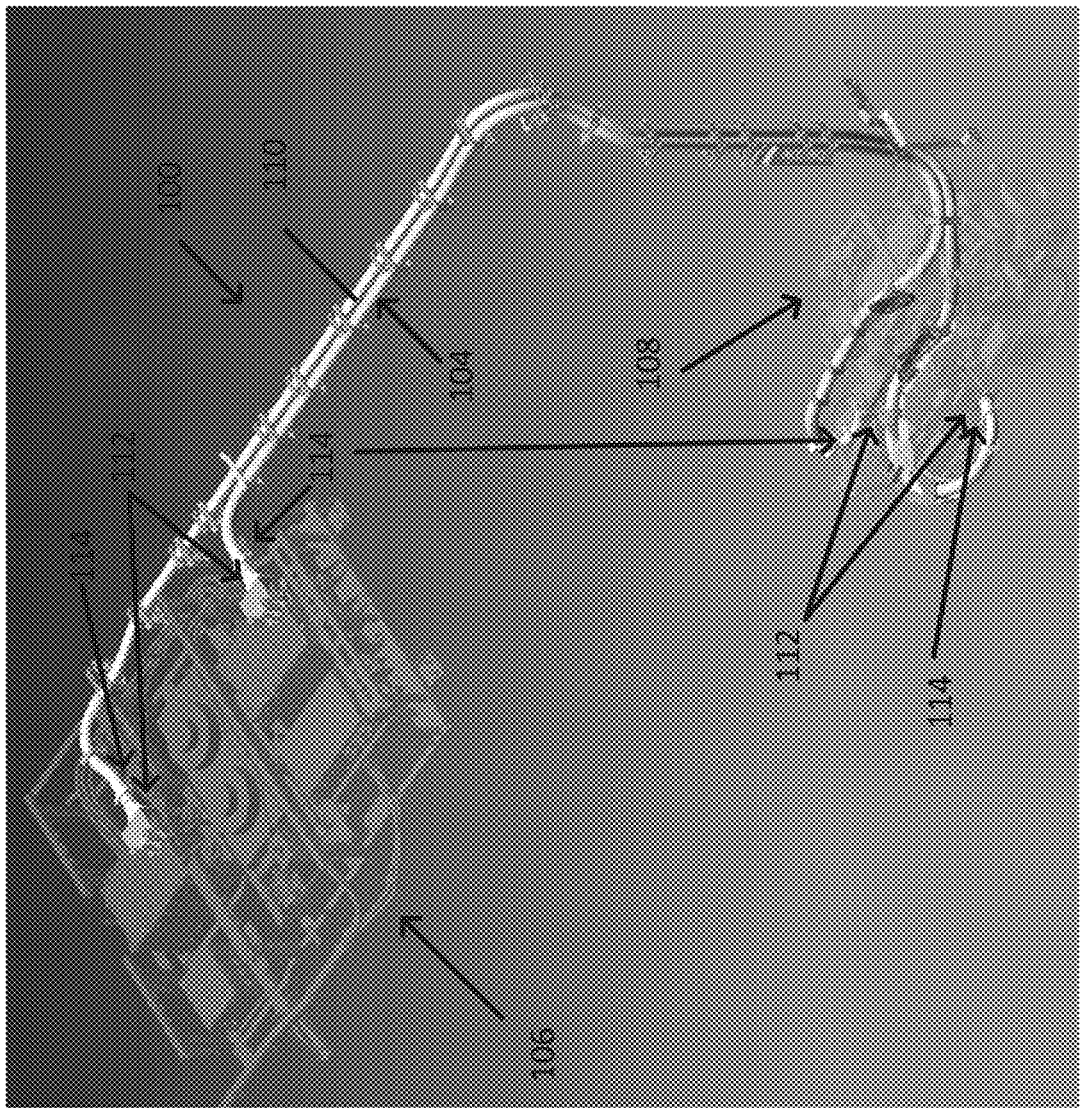
FIG. 1 is a first cutaway view of a system for mechanically and electrically connecting a vehicle and a wiring harness assembly, according to some aspects.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or aspects so described and illustrated.

While the subject matter of this disclosure has been described and shown in considerable detail with reference to certain illustrative aspects, including various combinations and sub-combinations of features, those skilled in the art will readily appreciate other aspects and variations and modifications thereof as encompassed within the scope of the present disclosure. Moreover, the descriptions of such aspects, combinations, and sub-combinations is not intended to convey that the disclosed subject matter requires features or combinations of features other than those expressly recited in the aspects. Accordingly, the scope of this disclosure is intended to include all modifications and variations encompassed within the spirit and scope of the following appended aspects.

Aspects of the present disclosure have been fully described above with reference to the drawing figures. Although the aspects of the disclosure have been described based upon these preferred aspects, it would be apparent to those of skill in the art that certain modifications, variations, and alternative constructions could be made to the described aspects within the spirit and scope of the disclosure.

Throughout the drawings in this specification, dark, dashed lines may be used to show a "cutaway" of a drawing. It will be understood that this is done to reveal internal features of various elements, and that the dark, dashed lines are not themselves a part of the elements, unless explicitly described as such in the description.

A system 100 for mechanically and electrically connecting a vehicle 102 and a wiring harness assembly 104 connected to a power distribution unit (PDU) 106 on top of the vehicle 102 and a traction motor 108 attached to, within, or otherwise coupled to the vehicle 102 is now described, according to some aspects.

Figure 2:
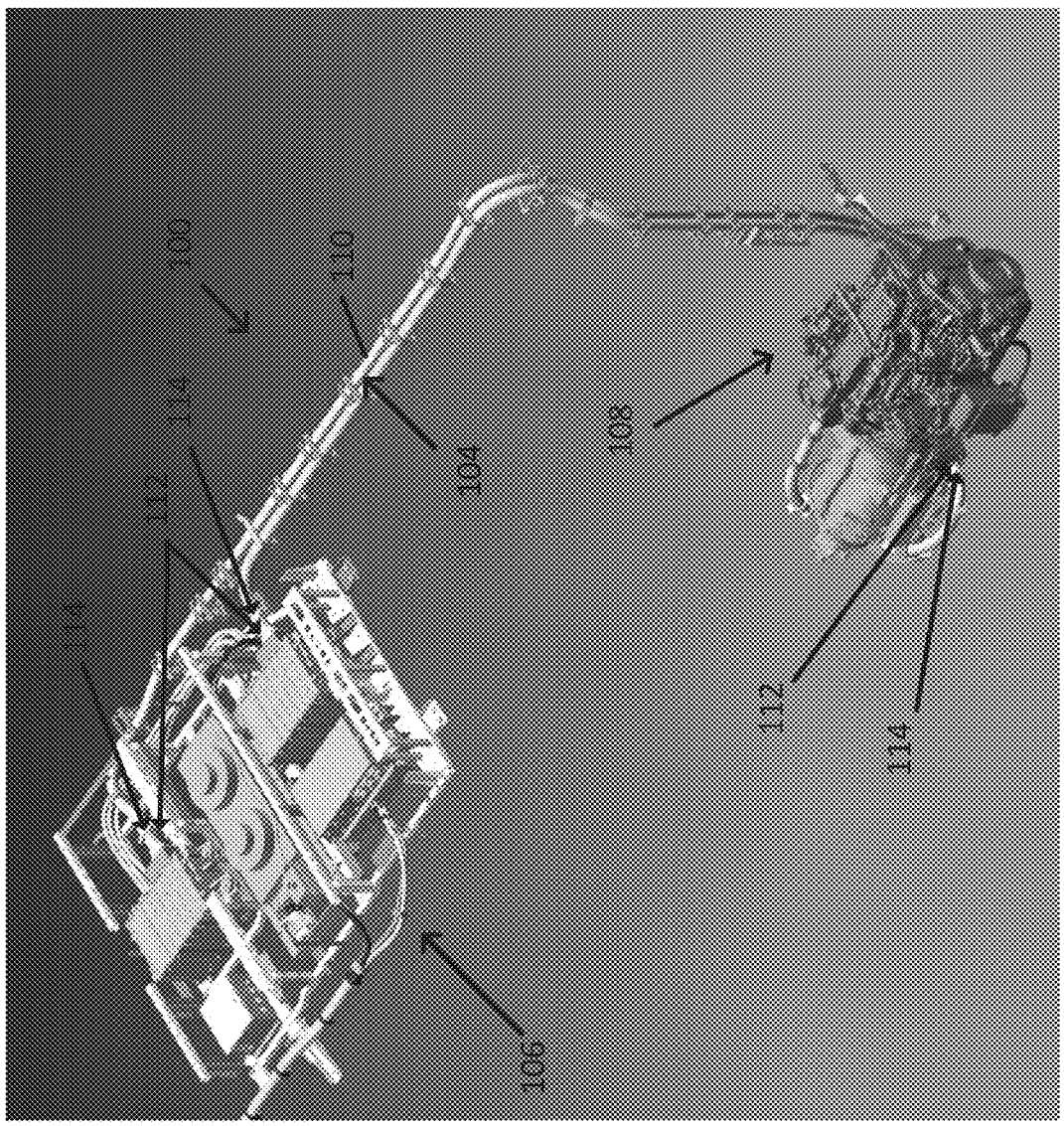
FIG. 2 is a second cutaway view of a system for mechanically and electrically connecting a vehicle and a wiring harness assembly, according to some aspects.

FIGS. 1 and 2 show the PDU 106 connected to the traction motor 108 by means of a system 100, according to some aspects. According to some aspects, the wiring harness assembly 104 is secured to the PDU 106 and to the motor 108 by means of an adapter plate 112 and a coupling assembly 114. According to some aspects, the high voltage wiring harness 104 is a 600V rated transportation harness. According to some aspects, the adapter plate 112 may provide an electrical and mechanical connection to the vehicle 102. According to some aspects, the wiring harness assembly 104 may include a tubing 110. According to some aspects, the tubing 110 of the system 100 may protect the system 100 from abrasion and substantial temperature fluctuations. According to some aspects, these substantial temperatures may range from −70 to 260 degrees Celsius.

As shown in FIGS. 1 and 2, the system 100 may have symmetry at its endpoints, according to some aspects. That is, at one end of the system 100, there may be a coupling assembly 114 and adapter plate 112 that form a connection to either a PDU 106 or a motor 108, and, at the other end of the system 100, there may also be a coupling assembly 114 and an adapter plate 112 that form a connection to either a PDU 106 or a motor 108, according to some aspects.

FIG. 1 shows the PDU 106 and the motor 108 as semi-transparent to show the internal workings of the elements 106, 108. According to some aspects, the PDU 106 may be powered by a lithium ion battery. According to some aspects, the battery provides direct current (DC) to the PDU 106 which converts the DC into alternating current (AC). This AC is then used to drive the traction motor 108. According to some aspects, the PDU 106 is capable of making determinations and adjusting power in accordance with what the vehicle's 102 operator is doing.

Figure 3:
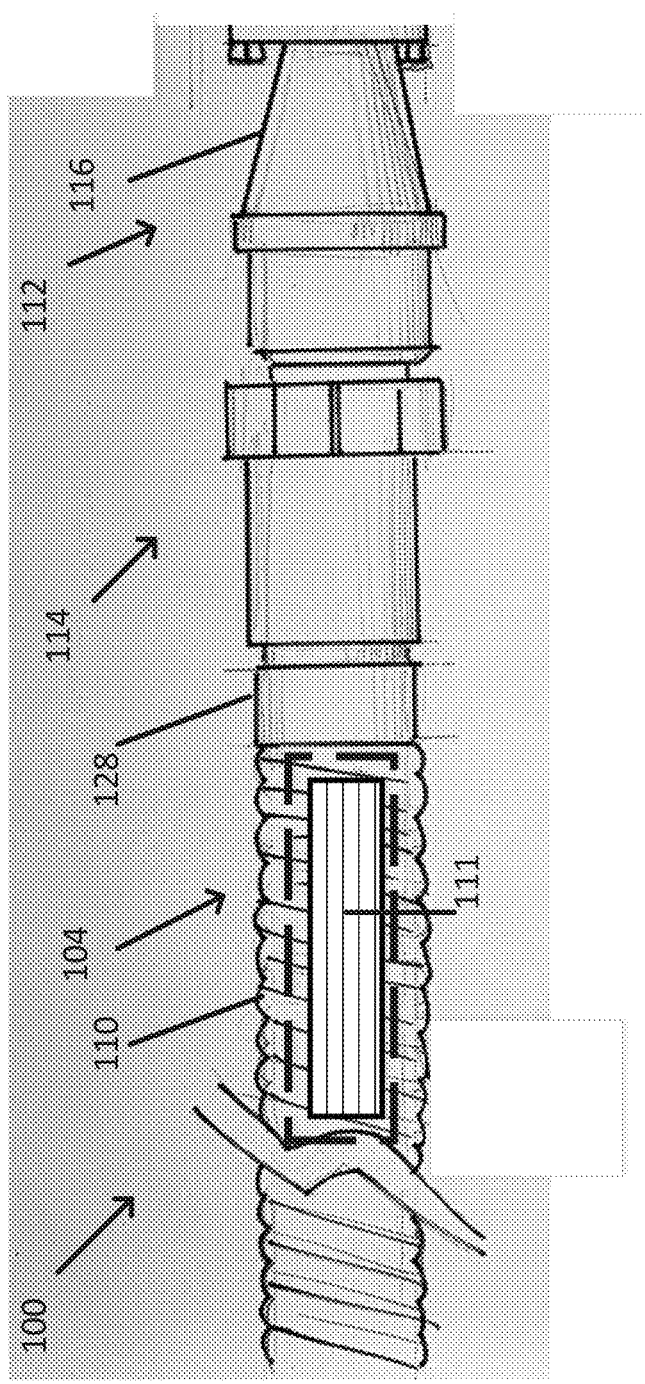
FIG. 3 is a side view with a cutaway of a system for mechanically and electrically connecting a vehicle and a wiring harness assembly, according to some aspects.

FIG. 3 shows a side view of the system 100, including a wiring harness assembly 104 enclosed in a tubing 110, according to some aspects. According to some aspects, the tubing 110 is connected to the adapter plate 112 by means of a coupling assembly 114. According to some aspects, the adapter plate 112 includes several elements (housing 116, gland 118, band clamp 120, grounding braid 122, adapter with flats 124, and O-ring 132), which are described in detail below in the description of FIG. 4's exploded view. According to some aspects, the coupling assembly 114 includes several elements (clamp 126, conduit 128, and a second gasket 134), which are also described in detail below in the description of FIG. 4's exploded view. According to some aspects, as shown in the cutaway of FIG. 3, the wiring harness assembly 104 includes internal wiring 111. It will be understood that, according to some aspects, the tubing 110 encloses the wiring 111, and that FIG. 3 is shown as a cutaway (using dark, dashed lines) with respect to the wiring 111, for illustration purposes.

Figure 4:
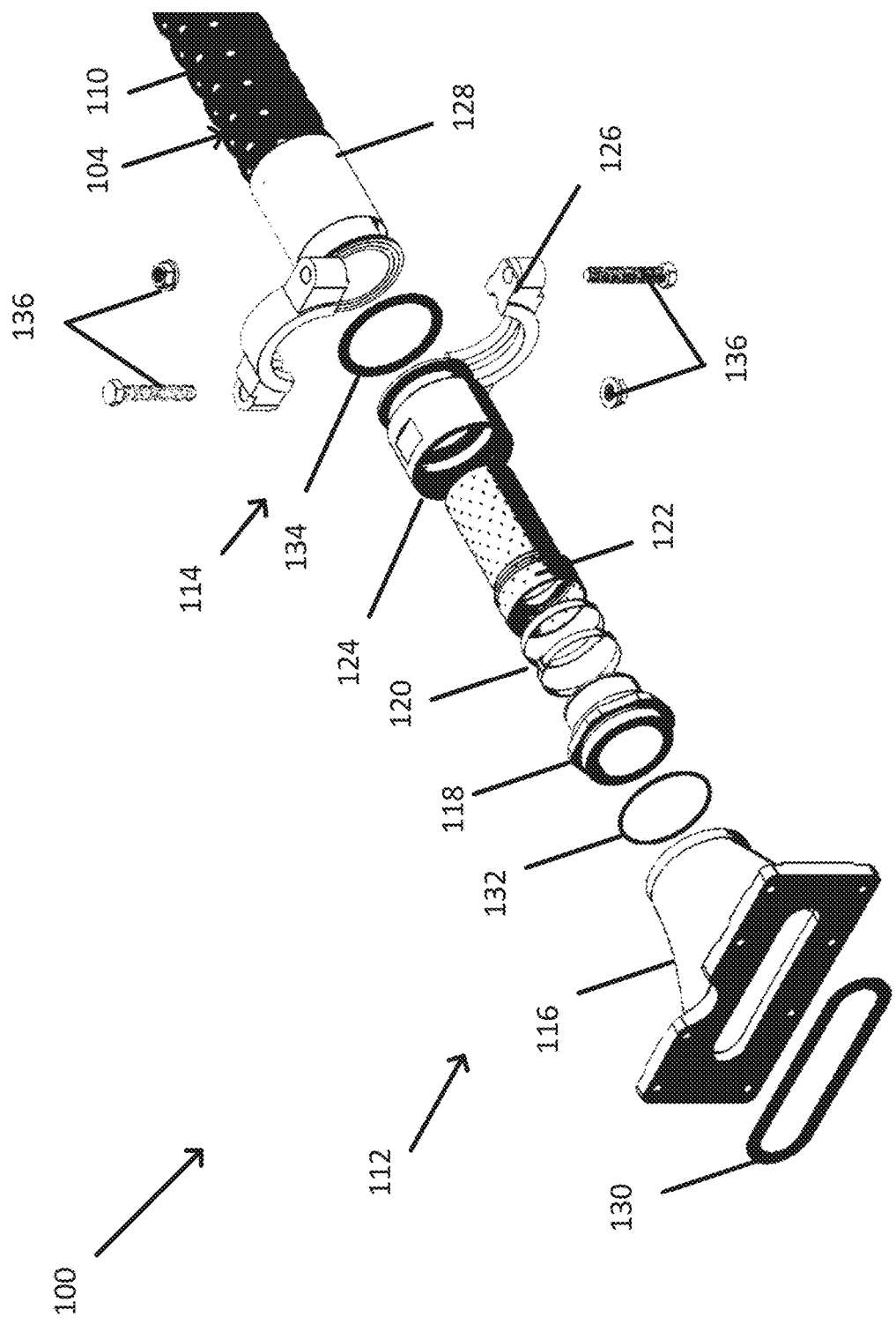
FIG. 4 is an isometric, exploded view of a system for mechanically and electrically connecting a vehicle and a wiring harness assembly, according to some aspects.

FIG. 4 shows an isometric, exploded view of the system 100 for mechanically and electrically connecting a vehicle 102 and a wiring harness assembly 104, according to some aspects. According to some aspects, the system 100 includes an adapter plate 112.

Figure 10:
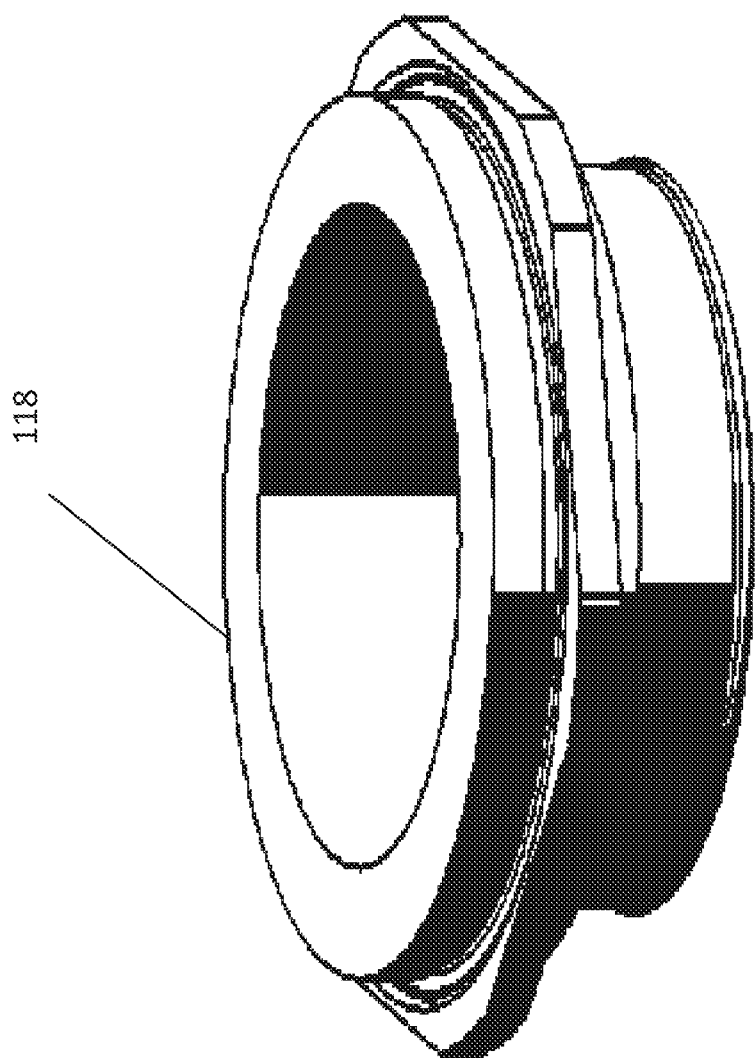
FIG. 10 is an isometric view of a gland of a system for mechanically and electrically connecting a vehicle and a wiring harness assembly enclosed in a tubing, according to some aspects.
Figure 11:
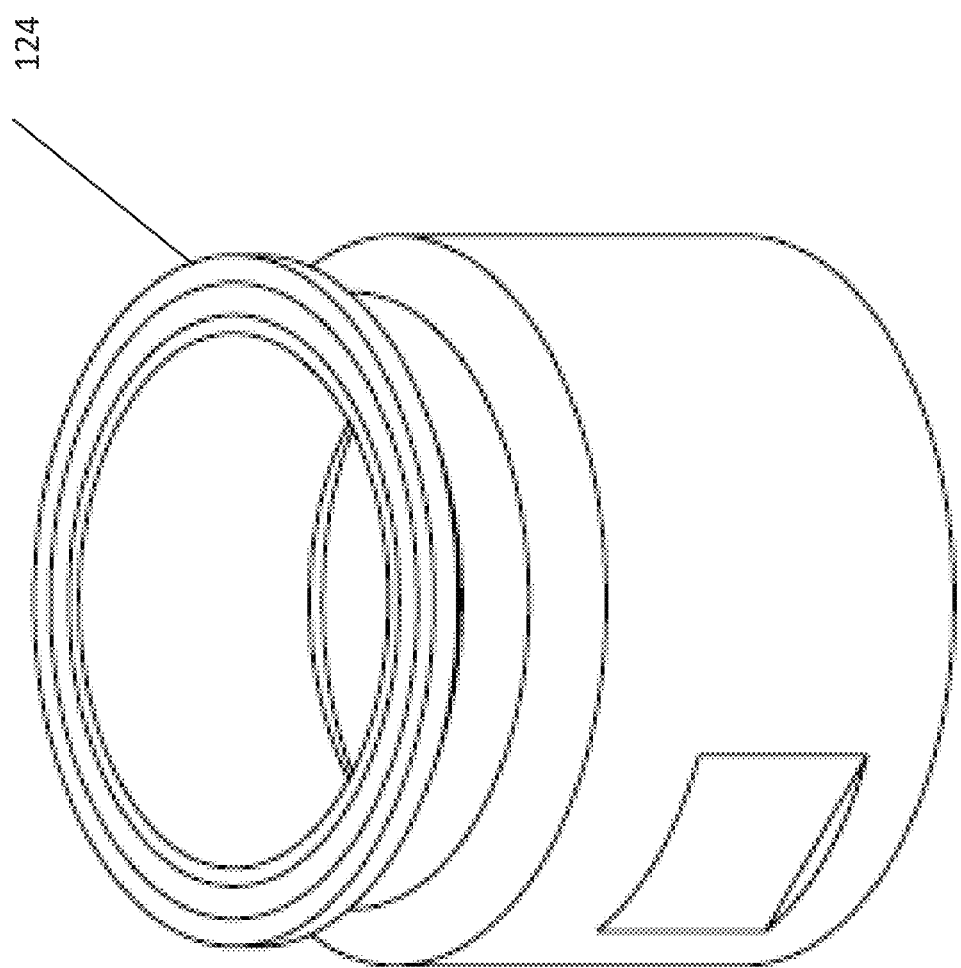
FIG. 11 is an isometric view of an adapter with flats of a system for mechanically and electrically connecting a vehicle and a wiring harness assembly enclosed in a tubing, according to some aspects.

As shown in at least FIG. 4, according to some aspects, the adapter plate 112 includes a housing 116 (as shown isolated in an isometric view in FIG. 9) that encases a gland 118 (as shown isolated in an isometric view in FIG. 10), a band clamp 120, a grounding braid 122, an adapter with flats 124 (as shown isolated in an isometric view in FIG. 11), and an O-ring 132. According to some aspects, these components 118, 120, 122, 124, 132 of the adapter plate 112 are connected in series and at least the gland 118, the band clamp 120, and a portion of the grounding braid 122 are secured within the housing 116.

According to some aspects, the adapter plate 112 provides an electrical and mechanical connection between the wiring harness assembly 104 and the vehicle 102. According to some aspects, the adapter plate 112 may form a water tight seal between the wiring harness assembly 104 and the vehicle 102. According to some aspects, the grounding braid 122 wraps around the internal wiring 111. According to some aspects, the grounding braid 122 may complete an electrical circuit between the grounding braid 122 and the vehicle 102. According to some aspects, the second gasket 134 may be made of Viton™ fluoroelastomers. According to some aspects, the adapter with flats 124 may be composed of aluminum.

As shown further in at least FIG. 4, according to some aspects, system 100 includes a coupling assembly 114 that connects the adapter plate 112 to the wiring harness assembly 104. According to some aspects, the coupling assembly 114 includes, a clamp 126, a conduit 128, and a second gasket 134 (as shown isolated in an isometric view in FIG. 12B). According to some aspects, the coupling assembly 114 aids in forming a connection between the wiring harness assembly 104 and the adapter plate 112. According to some aspects, the conduit 128 may be attached to the end of the tubing 110 of the wiring harness assembly 104. According to some aspects, the clamp 126 may be used to secure the coupling assembly 114 to the adapter plate 112.

According to some aspects, the material of the coupling assembly 114 and its various components may be composed of a variety of materials, including stainless steel. According to some aspects, the clamp 126 may be composed of aluminum. According to some aspects, the components of the coupling assembly 114 may all be composed of the same material. According to other aspects, the components of the assembly 114 may each be composed of different materials. According to some aspects, the components used within the coupling assembly 114 may be made from components used traditionally in the dairy industry.

Figure 12A:
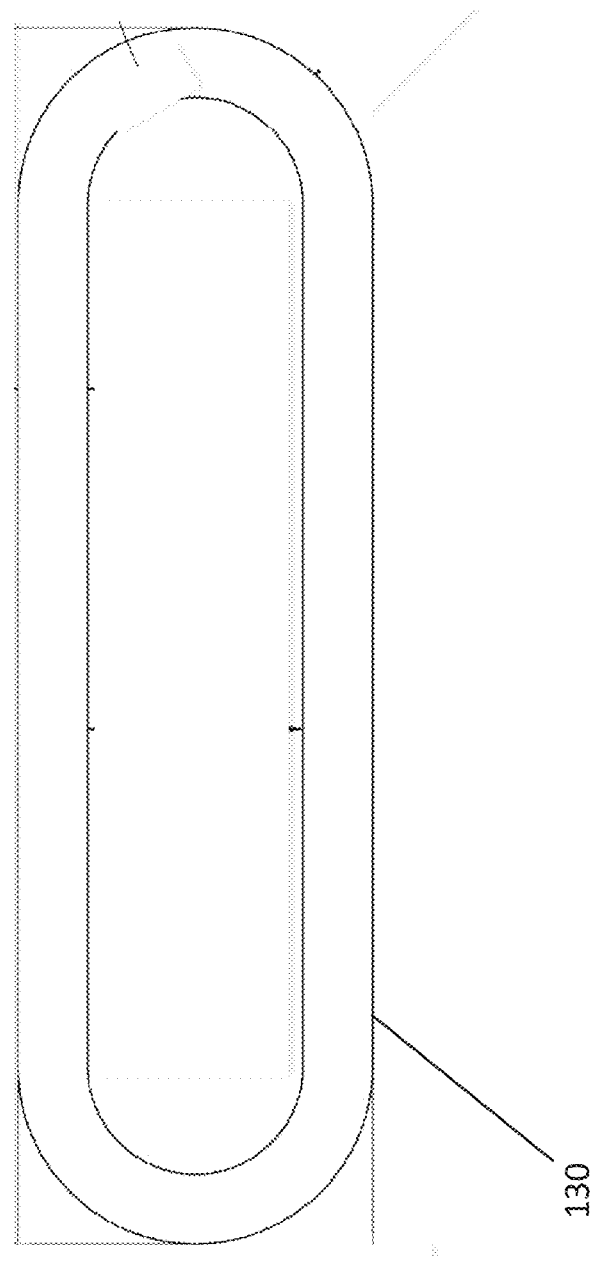
FIG. 12A is a drawing of a first gasket of a system for mechanically and electrically connecting a vehicle and a wiring harness assembly, according to some aspects.
Figure 12B:
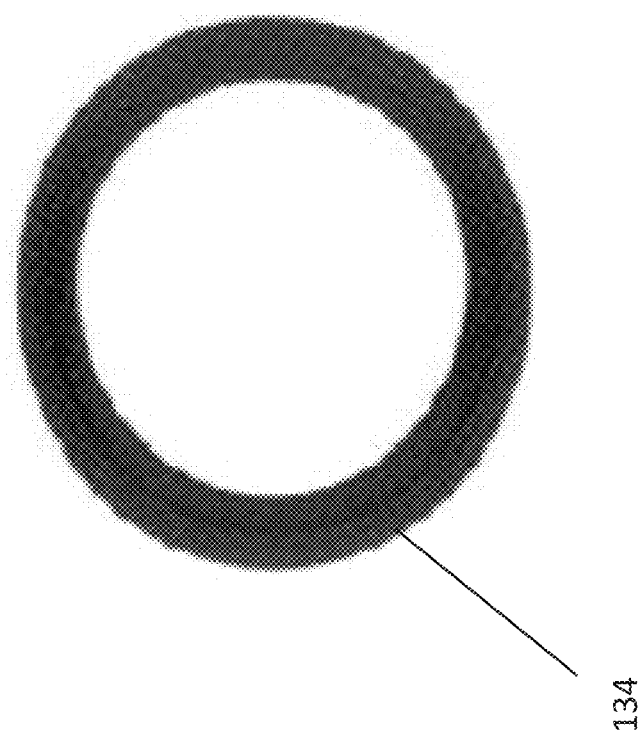
FIG. 12B is a drawing of a second gasket of a system for mechanically and electrically connecting a vehicle and a wiring harness assembly, according to some aspects.

According to some aspects, the system 100 includes a first gasket 130 (as shown isolated in an isometric view in FIG. 12A). According to some aspects, the first gasket 130 aids in connecting the adapter plate 112 to the vehicle 102. According to some aspects, the first gasket 130 may be composed of 50 durometer high strength silicone.

Figure 5:
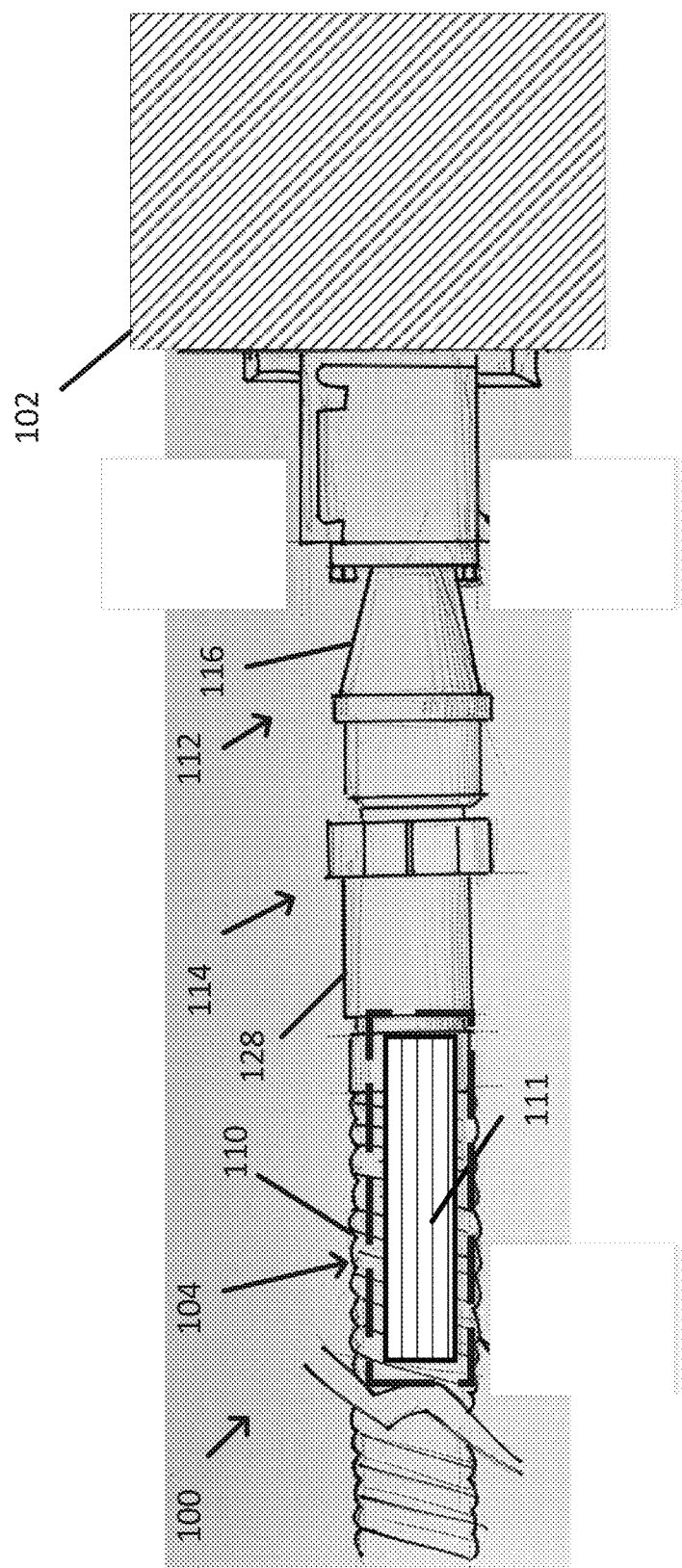
FIG. 5 is a side view with a cutaway of a vehicle coupled to a system for mechanically and electrically connecting the vehicle and a wiring harness assembly, according to some aspects.
Figure 6:
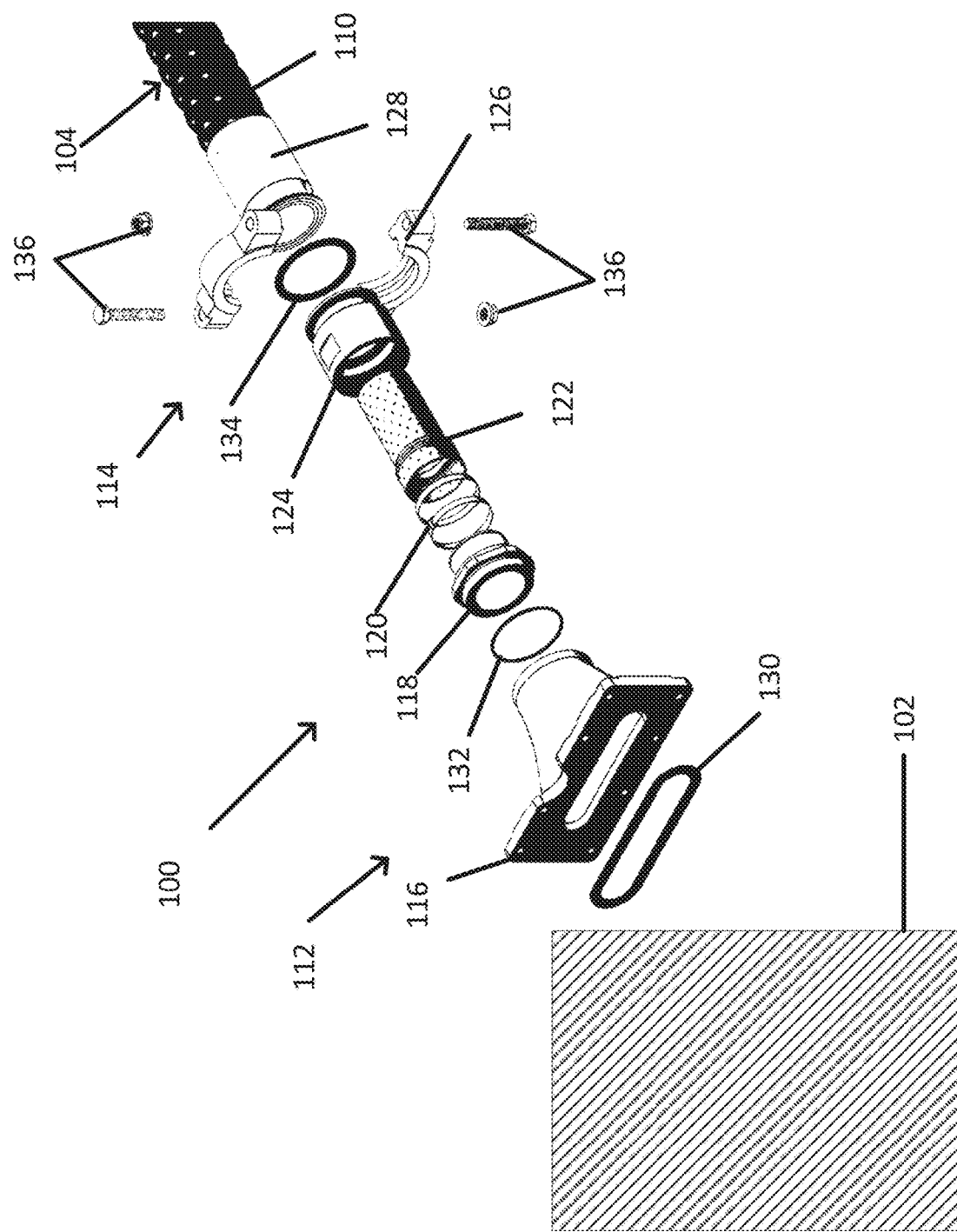
FIG. 6 is an exploded view of a vehicle coupled to a system for mechanically and electrically connecting the vehicle and a wiring harness assembly, according to some aspects.

According to some aspects, and as shown in FIGS. 5 and 6, the system 100 may be connected to the vehicle 102 (e.g., at a motor 108, as shown in FIGS. 1 and 2). According to some aspects, the first gasket 130 may be positioned between the adapter plate 112 and the vehicle 102 to aid in making a secure connection. According to some aspects, the adapter plate 112 may form an electrical and mechanical connection to the vehicle 102 and also provide a water tight seal between the vehicle 102 and the wiring harness assembly 104. According to some aspects, by providing abrasion protection and protection from substantial temperature fluctuations to the vehicle 102, the system 100 may enable the vehicle 102 to operate under increasingly unfavorable conditions, in which the vehicle 102 may not have been able to operate without the system 100.

According to some aspects, and as shown in FIGS. 4 and 6, the various components of the system 100 may be secured by fasteners 136. According to some aspects, the fasteners 136 may be nuts and bolts as shown in FIGS. 4 and 6. However, the fasteners may also be different components sufficient to secure the components of the system 100.

Figure 7:
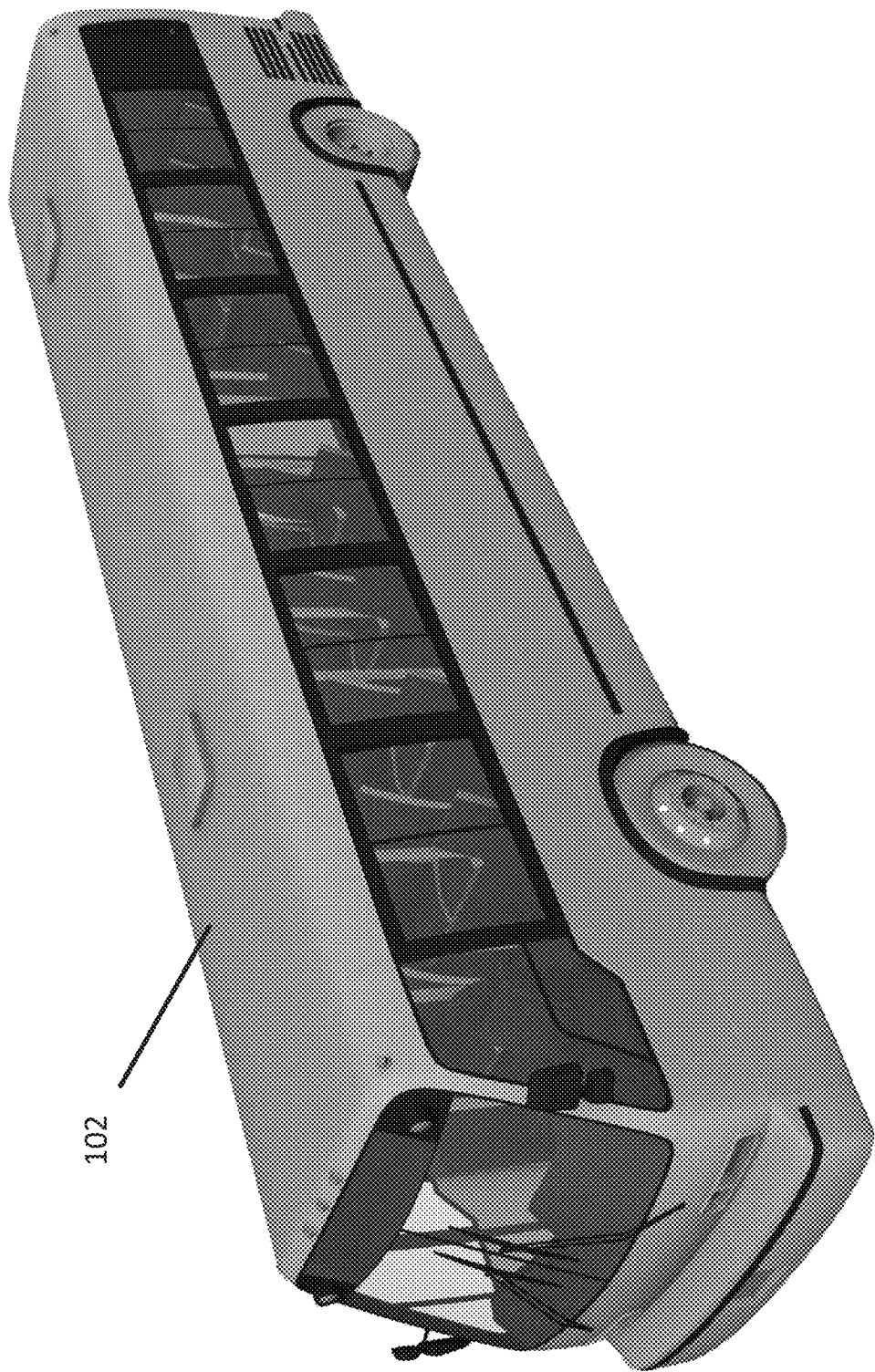
FIG. 7 is a vehicle of a system for mechanically and electrically connecting the vehicle and a wiring harness assembly, according to some aspects.

According to some aspects, and as shown in FIG. 7, the vehicle 102 may be a bus. According to other aspects, the vehicle 102 may be any type of heavy duty transportation vehicle, such as a semi-truck, a train, a trolley, or a cable car. According to other aspects, the vehicle 102 may be a watercraft, such as a cargo vessel, an inter-island boat, or a jet ski. According to some aspects, the system 100 may change in size and shape (while not changing its functionality or component parts) to accommodate different sizes and types of vehicles 102.

Figure 8:
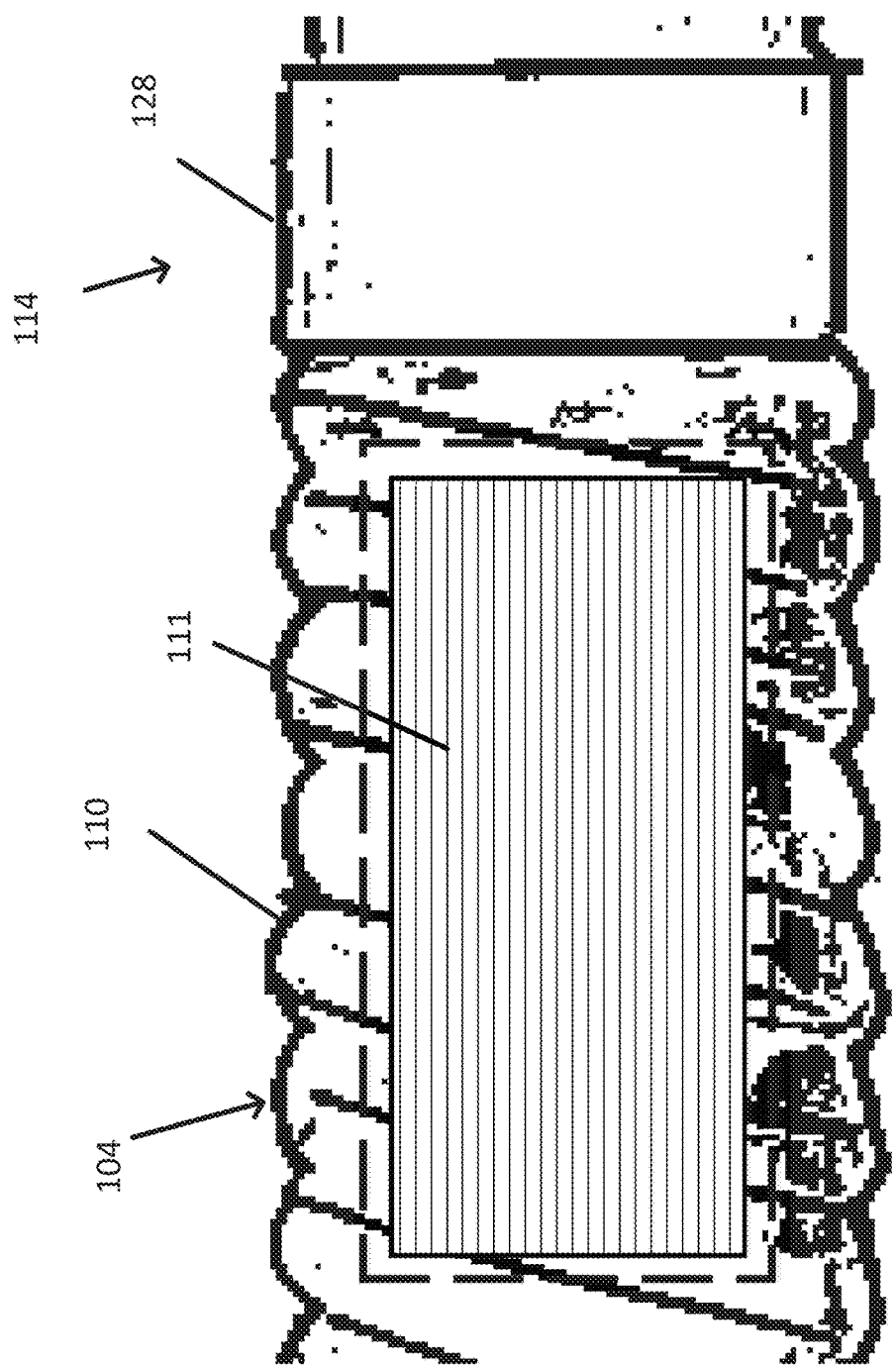
FIG. 8 is a side view with a cutaway of a wiring harness assembly for mechanically and electrically connecting a vehicle and the wiring harness assembly, according to some aspects.

FIG. 8 shows a side view with a cutaway of a wiring harness assembly 104 that includes a tubing 110 for mechanically and electrically connecting a vehicle 102, according to some aspects. According to some aspects, the internal wiring 111 of the wiring harness assembly 104 that is enclosed in the tubing 110 is protected from abrasion and from substantial temperatures by the tubing 110. According to some aspects, these substantial temperatures may range from −70 to 260 degrees Celsius. According to some aspects, the internal wiring 111 of the system 100 may be tied together (for example, by a technician using ties like zip-ties) and enclosed within the tubing 110. According to some aspects, the internal wiring 111 may be enclosed within the tubing 110 by threading the collected wiring 111 through the tubing 110.

According to some aspects, the tubing 110 is convoluted. According to some aspects, the tubing 110 may be composed of a single material that may be polytetrafluoroethylene. According to some aspects, the tubing 110 may be composed of two materials that may include polypropylene and/or polyethylene. According to some aspects, the use of a single material, polytetrafluoroethylene, for the tubing 110 may enhance the ability of the system 100 to provide abrasion protection and protection from substantial temperature fluctuations.

Figure 9:
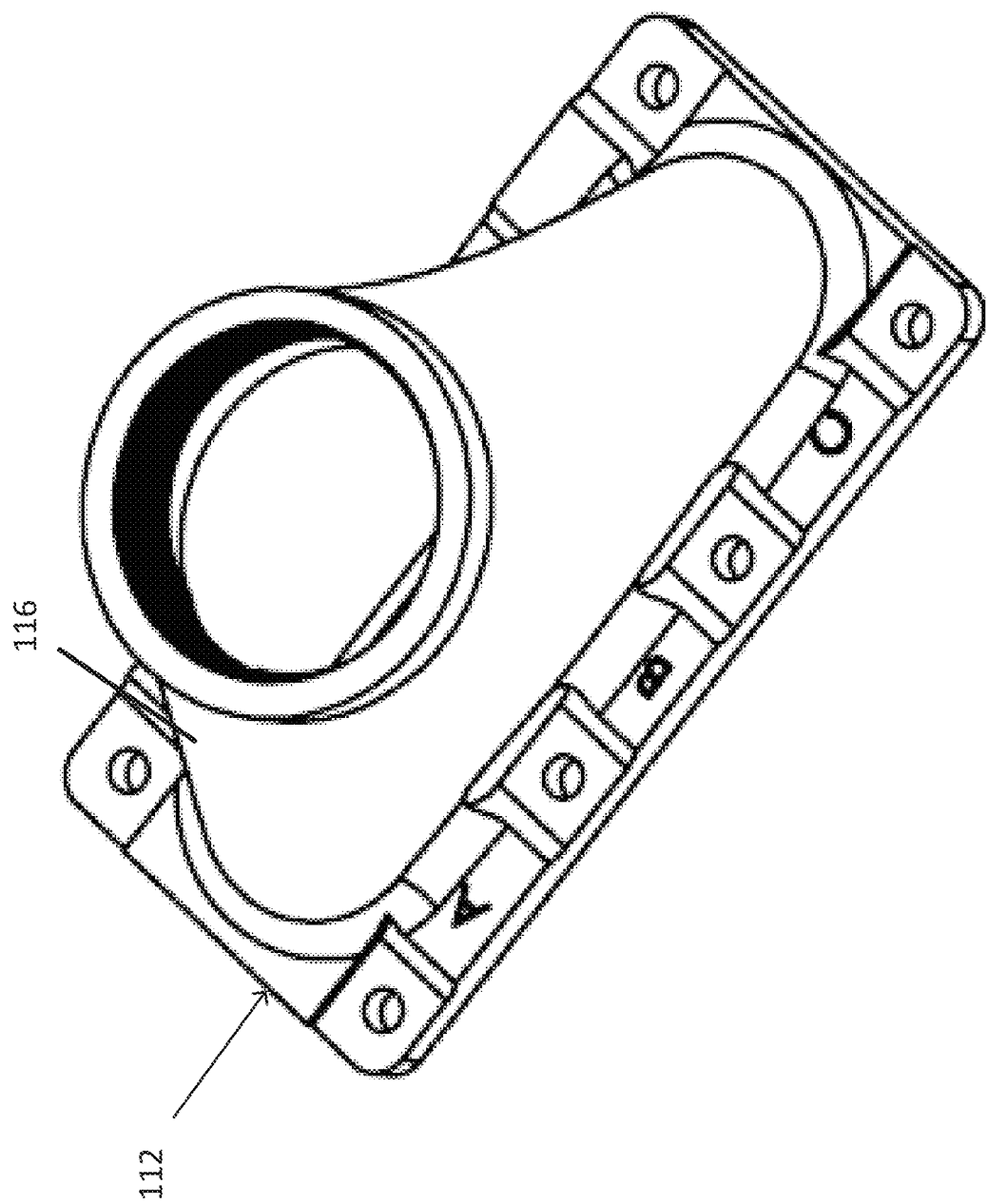
FIG. 9 is an isometric view of an adapter plate of a system for mechanically and electrically connecting a vehicle and a wiring harness assembly, according to some aspects.

FIG. 9 shows an isometric view of the adapter plate 112 and the adapter plate housing 116. According to some aspects, and as shown in FIG. 9, the adapter plate 112 includes a rectangular base. According to some aspects, the rectangular base has an interior gap and a notch in one of its edges. According to some aspects, a cylinder is connected to the rectangular base. According to some aspects, the cylinder includes an elliptical bottom, a circular top, and a surface that connects the circular bottom to the circular top. According to some aspects, the circular bottom is connected to the rectangular base, and the radius of the semimajor axis of the elliptical bottom is larger than the radius of the circular top. According to some aspects, the cylinder is welded to the rectangular base. According to some aspects, the rectangular base and the cylinder are connected such that the rectangular base and the cylinder are a single component. According to some aspects, the cylinder is connected to the rectangular base of the adapter plate 112 by a plurality of fasteners.

Methods for connecting a high voltage wiring harness assembly 104 to a vehicle 102 using a tubing 110, an adapter plate 112, and a coupling assembly 114, according to some aspects, are now described. It will be understood that the detailed descriptions above describing the components of the system 100 also apply to the components of the system 100 used in the methods described below.

Figure 13:
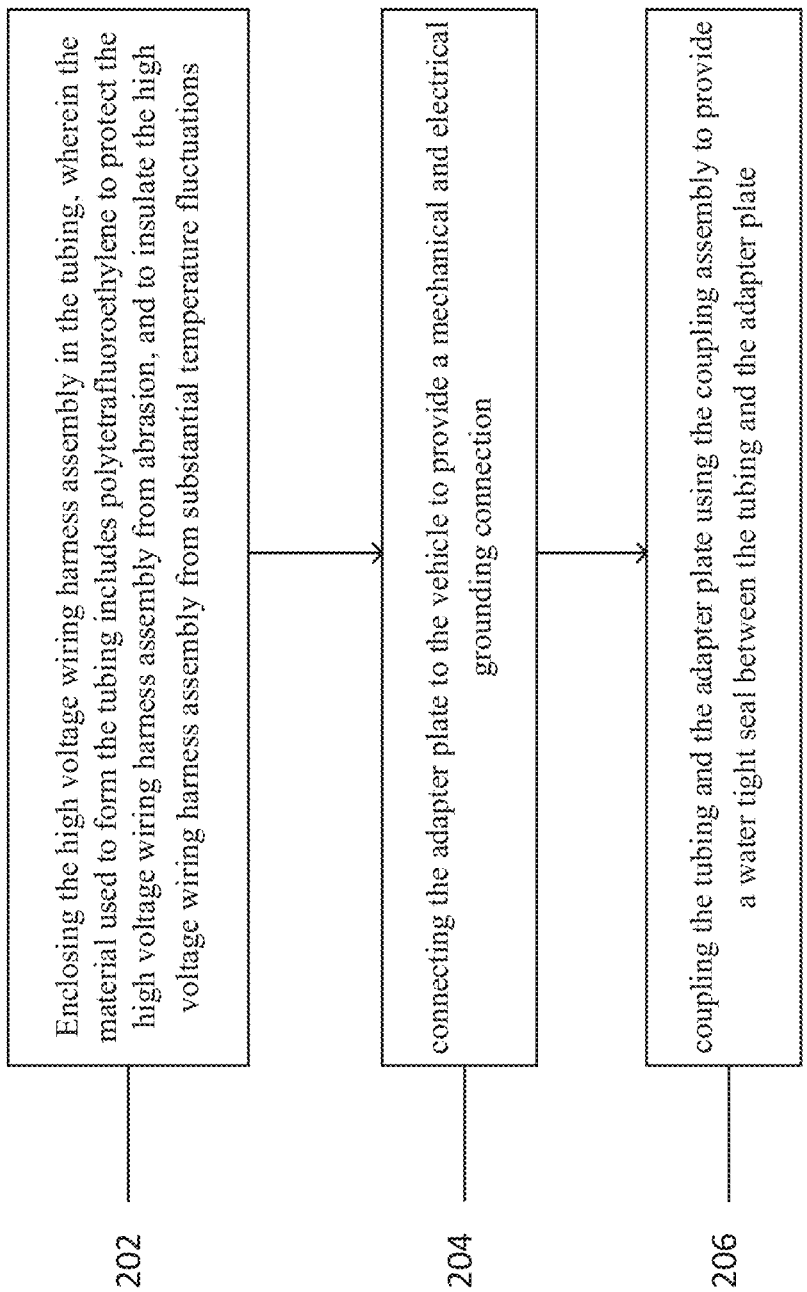
FIG. 13 is a flow chart for a method of use for mechanically and electrically connecting a vehicle and a wiring harness assembly, according to some aspects.

According to some aspects, and as shown in FIG. 13, a method 200 is provided for connecting a high voltage wiring harness assembly 104 to a vehicle 102 using a tubing 110, an adapter plate 112, and a coupling assembly 114.

According to some aspects, the method 200 may include enclosing 202 the high voltage wiring harness assembly 104 in the tubing 110. According to some aspects, the material used to form the tubing 110 may include polytetrafluoroethylene. According to some aspects, the material may also protect the high voltage wiring harness assembly 104 from abrasion. According to some aspects, the material may also insulate the high voltage wiring harness assembly 104 from substantial temperature fluctuations.

According to some aspects, the method 200 may further include connecting 204 the adapter plate 112 to the vehicle 102 to provide a mechanical and electrical grounding connection.

According to some aspects, the method 200 may further include coupling 206 the tubing 110 and the adapter plate 112 using the coupling assembly 114 to provide a water tight seal between the tubing 110 and the adapter plate 112. According to some aspects, the high voltage wiring harness assembly 104 used in the method 200 may include a grounding braid 122. According to some aspects, the grounding braid 122 used in the method 200 may be coupled to the adapter plate 112 using the coupling assembly 114 to complete an electrical circuit between the grounding braid 122 and the vehicle 102.

According to some aspects, when enclosing the internal wiring 111 in the tubing 110, the individual wire cords of the internal wiring 111 are threaded together to efficiently utilize space within the tubing 110. According to some aspects, the internal wiring 111 may be held together by ties (like zip-ties) before being covered by the tubing 110. According to some aspects, the grounding braid 122 may then be pulled over the internal wiring 111. According to some aspects, the tubing 110 may then be enclosed around the internal wiring 111. According to some aspects, the coupling assembly 114 may be attached to the end of the internal wiring 111 enclosed within the tubing 110 (creating the wiring harness assembly 104). According to some aspects, the wiring harness assembly 104 attached to the coupling assembly 114 may then be attached to the adapter plate 112. According to some aspects, the adapter plate 112 may then be connected to the vehicle 102.

The invention claimed is:

1. A system for connecting a high voltage wiring harness assembly to a vehicle, the system comprising:
   a tubing providing an enclosure for wiring of the high voltage wiring harness assembly, wherein the material used to form the tubing includes polytetrafluoroethylene, to protect the high voltage wiring harness assembly from abrasion, and to insulate the high voltage wiring harness assembly from substantial temperature fluctuations;
   an adapter plate providing a mechanical and electrical grounding connection to the vehicle; and
   a coupling assembly coupling the tubing and the adapter plate, wherein the coupling provides a water tight seal between the tubing and the adapter plate, wherein the coupling assembly comprises a clamp to secure components of the coupling assembly to the adapter plate,
   wherein the high voltage wiring harness assembly includes a grounding braid and wherein the grounding braid is coupled to a housing of the adapter plate completing an electrical circuit between the grounding braid and the vehicle, and wherein the housing encases a gland, a band clamp, and the grounding braid with flats and an O-ring.

2. The system of claim 1, wherein the coupling assembly is composed of stainless steel.

3. The system of claim 1, wherein the tubing is convoluted.

4. The system of claim 1, wherein the material used to form the tubing further includes polypropylene and polyethylene.

5. The system of claim 1, wherein the material used to form the tubing insulates the high voltage wiring harness assembly from substantial temperature fluctuations ranging from −70 degrees Celsius to 260 degrees Celsius.

6. The system of claim 1, wherein the adapter plate comprises:
   a rectangular base, wherein the rectangular base has an interior gap and a notch in one of its edges, wherein the notch is curved and positioned at a top of the rectangular base; and
   a cylinder connected to the rectangular base, wherein the cylinder comprises an elliptical bottom, a circular top, and a surface that connects the circular bottom to the circular top,
   wherein the circular bottom is connected to the rectangular base, and
   wherein the radius of the semimajor axis of the elliptical bottom is larger than the radius of the circular top.

7. The system of claim 6, wherein the cylinder is welded to the rectangular base.

8. The system of claim 6, wherein the rectangular base and the cylinder are connected such that the rectangular base and the cylinder are a single component.

9. The system of claim 6, wherein the cylinder is connected to the rectangular base of the adapter plate by a plurality of fasteners.

10. The system of claim 1, further comprising a gasket, wherein the gasket is connected to the adapter plate and the vehicle.

11. The system of claim 1, wherein the high voltage wiring harness is a 600V rated transportation harness.

12. The system of claim 1, wherein the coupling assembly comprises:
   a conduit coupled to an end of the tubing.

\* \* \* \* \*